Patented Feb. 9, 1954

2,668,841

UNITED STATES PATENT OFFICE 2,668,841

O-ETHYL O-(2,4,5-TRICHLOROPHENYL) METHANEPHOSPHONATE

Henry Tolkmith, Midland, Mich., assignor to The Dow Chemical Company, Midland, Mich., a corporation of Delaware No Drawing. Application April 21, 1953, Serial No. 350,225

1 Claim. (Cl. 260—461)

The present invention is directed to O-ethyl O-(2,4,5-trichlorophenyl) methanephosphonate of the formula

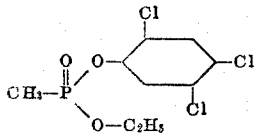

This compound is a viscous oil, somewhat soluble in many organic solvents and substantially insoluble in water. It is of value as an intermediate for the preparation of more complex phosphorus derivatives and as a toxic constituent of parasiticide compositions.

The new compound may be prepared by reacting at least one molecular proportion of ethanol with one molecular proportion of O-(2,4,5-trichlorophenyl) methanephosphonic chloride of the formula

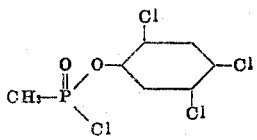

in an inert organic solvent such as diethyl ether or benzene. The reaction is carried out in the presence of a hydrogen chloride acceptor such as pyridine.

In carrying out the reaction, the ethanol and pyridine are dispersed in the solvent and the resulting mixture added portionwise with stirring to the O-(2,4,5-trichlorophenyl) methanephosphonic chloride dispersed in the same solvent. The reaction mixture is thereafter heated for a period of time at a temperature of from 30° to 80° C. In practice it is sometimes convenient to operate at the boiling temperature of the reaction mixture and under reflux. Upon completion of the reaction, the mixture may be filtered and the filtrate distilled under reduced pressure at gradually increasing temperatures to separate low boiling constituents and to obtain as a residue the desired O-ethyl O-(2,4,5-trichlorophenyl) methanephosphonate. Since the desired product has a tendency to decompose at temperatures in excess of 150° C., distillation temperatures in excess of 150° C. for any appreciable period of time should not be employed.

In a representative preparation, 33.3 grams (0.724 mole) of ethanol and 57.2 grams (0.725 mole) of pyridine were dispersed in 500 milliliters of diethyl ether and the resulting mixture added portionwise with stirring to 60 grams (0.21 mole) of O-(2,4,5-trichlorophenyl) methanephosphonic chloride dispersed in 300 milliliters of diethyl ether. The mixture was thereafter heated for 2.5 hours at the boiling temperature and under reflux. At the end of this period, the reaction product was filtered and the filtrate distilled under reduced pressure at temperatures gradually increasing up to a temperature of 50° C. to obtain as a residue O-ethyl O-(2,4,5-trichlorophenyl) methanephosphonate. The latter is a viscous oil having a density of 1.2530 at 25° C. and a refractive index $n/D$ of 1.4512.

The O-(2,4,5-trichlorophenyl) methanephosphonic chloride employed as a starting material in the above-described method may be prepared by reacting one molecular proportion of 2,4,5-trichlorophenol with at least one molecular proportion of methanephosphonic dichloride of the formula

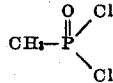

in an inert organic solvent such as benzene or diethyl ether. The reaction is carried out in the presence of a hydrogen chloride acceptor such as pyridine. In carrying out the reaction, the 2,4,5-trichlorophenol and the hydrogen chloride acceptor are dispersed in the solvent and the resulting mixture added portionwise with stirring to the methanephosphonic dichloride dispersed in the same solvent. The mixture is thereafter heated for a period of time at a temperature of from 35° to 80° C. to complete the reaction. The reaction takes place smoothly at the temperature range of from 20° to 80° C. and at a rate which varies directly with the employed temperature. The reaction is somewhat exothermic, temperature being controlled by regulation of the rate of contacting the reactants as well as by the addition or subtraction of heat, if required. Upon completion of the reaction, the mixture may be filtered and the filtrate concentrated by distillation under reduced pressure to obtain as a residue the desired O-(2,4,5-trichlorophenyl) methanephosphonic chloride. Distillation temperature substantially in excess of 150° C. for any appreciable period of time should not be employed as the desired product has a tendency to decompose at such temperature. O-(2,4,5-trichlorophenyl) methanephosphonic chloride is a viscous oil having a density of 1.5820 at 20° C. The latter compound and described method for its production constitute the subject matter of my copending application Serial No. 203,757.

The new O-ethyl O-(2,4,5-trichlorophenyl) methanephosphonate product is effective as a parasiticide and adapted to be employed for the control of a wide range of agricultural and household pests such as flies, mites, aphids, beetles, cockroaches and Southern army worms. For such use, the compound may be dispersed on an inert finely divided solid and employed as a dust. Also such mixtures may be dispersed in water with the aid of a dispersing and wetting agent and the resulting aqueous suspension employed as sprays. In other procedures, the new product may be employed in oils, as a constituent in oil-in-water emulsions, or in water dispersion with or without the addition of emulsifying, wetting or dispersing agents. Suitable concentrations of the toxicant in dusts are in the order of from about 0.1 to 10 per cent by weight of the dust and in liquid suspensions from about 0.1 to 3 pounds per 100 gallons of the spray mixture. In representative operations, 100 percent kills of two-spotted spider mites, bean aphids, Mexican bean beetles and Southern army worms were obtained with aqueous spray compositions containing 1.0 pound of the toxic methanephosphonate per 100 gallons of spray mixture.

This is a continuation in part of my copending application Serial No. 203,752, filed December 30, 1950.

I claim:

O-ethyl O-(2,4,5-trichlorophenyl) methanephosphonate.

HENRY TOLKMITH.

No references cited.